April 30, 1957 O. E. HINTZ 2,790,291
AUXILIARY ENGINE DRIVE FOR HARVESTERS
Filed Dec. 11, 1953 2 Sheets-Sheet 1

INVENTOR
OTTO E. HINTZ

ATTORNEY

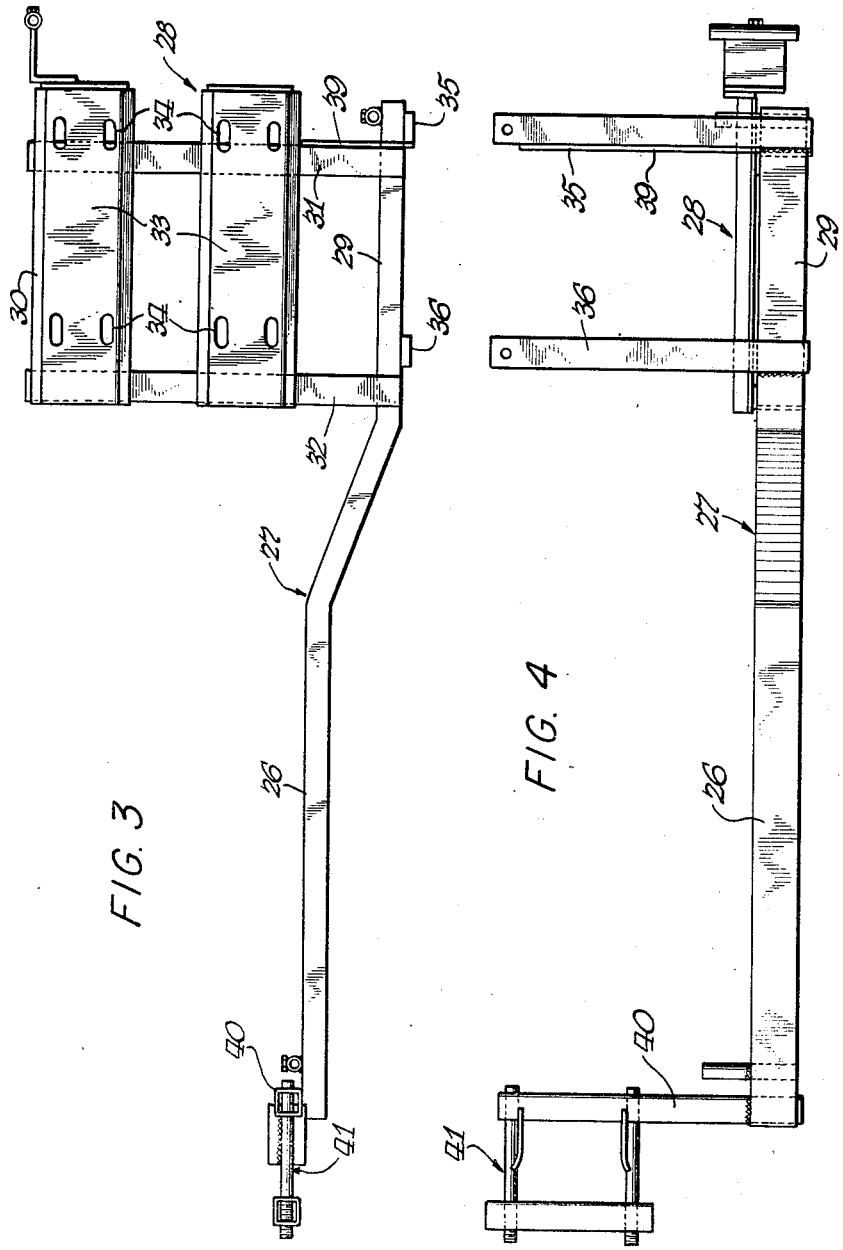

United States Patent Office 2,790,291
Patented Apr. 30, 1957

2,790,291

AUXILIARY ENGINE DRIVE FOR HARVESTERS

Otto E. Hintz, Riverside, Ill., assignor to International Harvester Company, a corporation of New Jersey Application December 11, 1953, Serial No. 397,563

2 Claims. (Cl. 56—10)

This invention relates to a mounting for an auxiliary engine from a tractor of the tricycle type in order to supplement the power requirements for equipment carried by the tractor and motivated from its power take-off.

A general object of the invention is to devise a novel auxiliary engine mounting for a tractor of the tricycle type wherein the auxiliary engine is carried by a novel support frame disposed alongside the tractor body and carried from a side rail thereof and the rear axle housing ahead of the same between the adjacent traction wheel and the opposed side of the tractor body.

A further object of the invention is to devise a novel framework of skeleton construction and wherein the framework is designed to have points of connection to the tractor at areas of the greatest strength thereof and in a position where it will not interfere with the normal implement mounting on the tractor or with wheel spacing adjustment.

A further object of the invention is to provide an arrangement for the mounting of an auxiliary engine and an implement on the tractor wherein the same are arranged in substantially counterbalancing relationship at opposite sides of the tractor body.

These and other objects of the invention will become more apparent from the specification and the drawings wherein:

Figure 3 is an enlarged plan view of the framework; and

Figure 4 is a side elevational view of the framework shown in Figure 3 taken from the tractorward side thereof.

Figure 1:
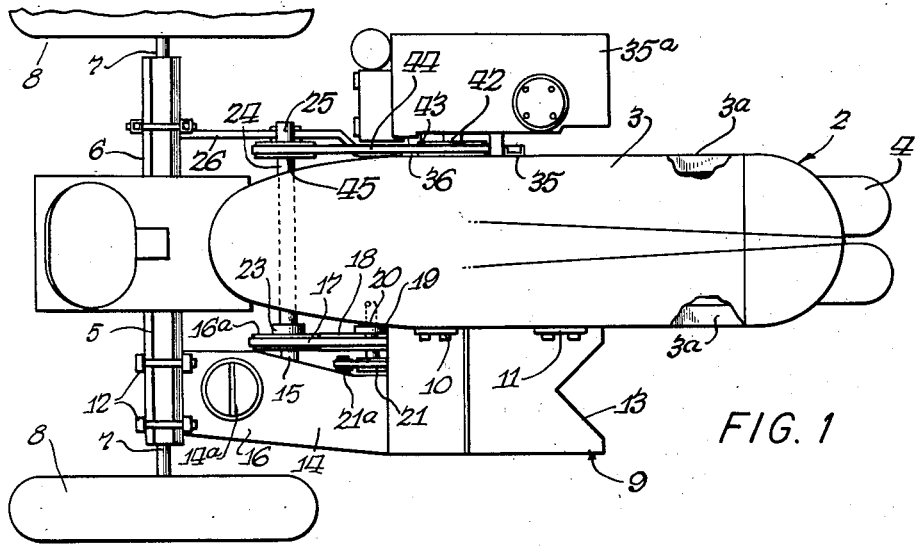
Figure 1 is a fragmentary plan view of a tractor illustrating the auxiliary engine and the mounting therefor at one side of the tractor and the mounting of the implement at the opposite side of the tractor.

The invention is illustrated in conjunction with a tricycle-type tractor, generally indicated 2, including a narrow body 3 supported at its front end by a front steering truck 4 and at its rear end being provided with transverse axle housings 5 and 6, each of which journals an axle 7 on which is mounted a traction wheel 8 in laterally outwardly spaced relationship to the tractor body 3. This defines a typical tricycle-type of tractor which along its body or waist portion 3 includes a longitudinal side rail 3a at each side thereof.

The invention is shown with a farm implement structure, generally designated 9, at the right side of the tractor along the waist 3 ahead of the rear axle 5, said implement having connection through the medium of braces 10 and 11 with the adjacent side rail 3a and at its rear end being connected as by clamps 12 to the rear axle housing 5. The implement may be of the type shown in U. S. Patent 2,634,569 wherein the forward part constitutes the gathering means or harvesting component 13 and the rearward part, the processing component 14, including a blower wherein is disposed a cutter head 14a as shown in U. S. Patent 2,656,868 driven by a shaft 15 journalled to opposite sides of the housing or casing 16 of the implement.

The shaft 15 may be connected to a sheave or driving element 16a which may be driven by a belt 17 or the like from the power take-off pulley 18 which is connected through an overrunning or one-way clutch shown graphically at 19 to a power take-off shaft 20 of the tractor and extending from the side thereof. Such side power take-off is conventional, as well understood by those in the art. The shaft 20 is also connected to driving assembly 21 in the form of sprockets, sheaves, belts, and the like to drive the input shaft 21a and parts drives connected thereto of the gathering components of the harvester.

It will be seen from the present consideration that upon the power take-off shaft 20 being stopped, attendant to stopping or disengaging the power take-off shaft, the heavy pulley flywheel 18 is intended to rotate and thus continue to drive the shaft 15 of the cutter head in order to discharge the material accumulated therein whereupon preventing plugging and high-torque inertia attendant to restarting operation of the unit.

The shaft 15 is connected through a one-way or overrunning clutch coupling graphically shown at 23 to one end of a co-axial shaft or drive transmitting means 24 which passes beneath the waist of the tractor to its opposite side and thereat is journalled in a bearing 25 which is mounted to a fore and aft extending torque arm 26 intermediate the ends thereof, of an engine-supporting framework or supplementary frame structure, generally indicated 27.

The framework, in addition to the arm 26, provides a laterally extending platform, generally indicated 28, and connected to the forward end of the arm 26 and extending laterally outwardly of the tractor waist ahead of the adjacent traction wheel 8. The platform 28 is constituted of a pair of inboard and outboard laterally spaced side beam members 29 and 30, of which the member 29 may be a continuation of the arm 26, and the fore and aft ends of the side members 29 and 30 are interconnected by front and rear transverse beam members 31 and 32. The front and rear members 31 and 32 are interconnected further by means of a plurality of laterally spaced floor members 33 which are suitably apertured at 34 to provide openings through which bolts may be passed for attachment to the underside of an auxiliary engine structure or supplementary power source 35a mounted upon the platform. The inboard side of the platform 28 as defined by the member 29 is connected adjacent to opposite ends of the member 29 to the lower ends of upstanding mounting members or supports 35 and 36 which may be channel-shaped and at their upper ends connected as by bolts 37 and 38 to the adjacent sill member 3a. The beam member 35 may be additionally connected to the front beam 31 by means of a gusset plate 39 weld-connected thereto.

The rear end of the torque arm extends to the adjacent axle housing 6 and is connected to the lower end of an upstanding mounting member or connector element 40 which at its upper end is associated with a clamp 41 which embraces the rear axle and by means of which the upper end of the arm 40 is connected to the rear axle 6.

It will be seen from a consideration of Figure 1 that the output shaft 42 of the engine 35a is provided with a pulley 43 which drives a belt 44 which in turn is trained about the drives a pulley 45 which is connected to the shaft 24.

It will be apparent that even upon stopping or discontinuing the drive of the power take-off shaft of the tractor as when the tractor stops, the engine or auxiliary power source 35a will continue to drive the cutter head insuring that the same is discharged.

Figure 2:
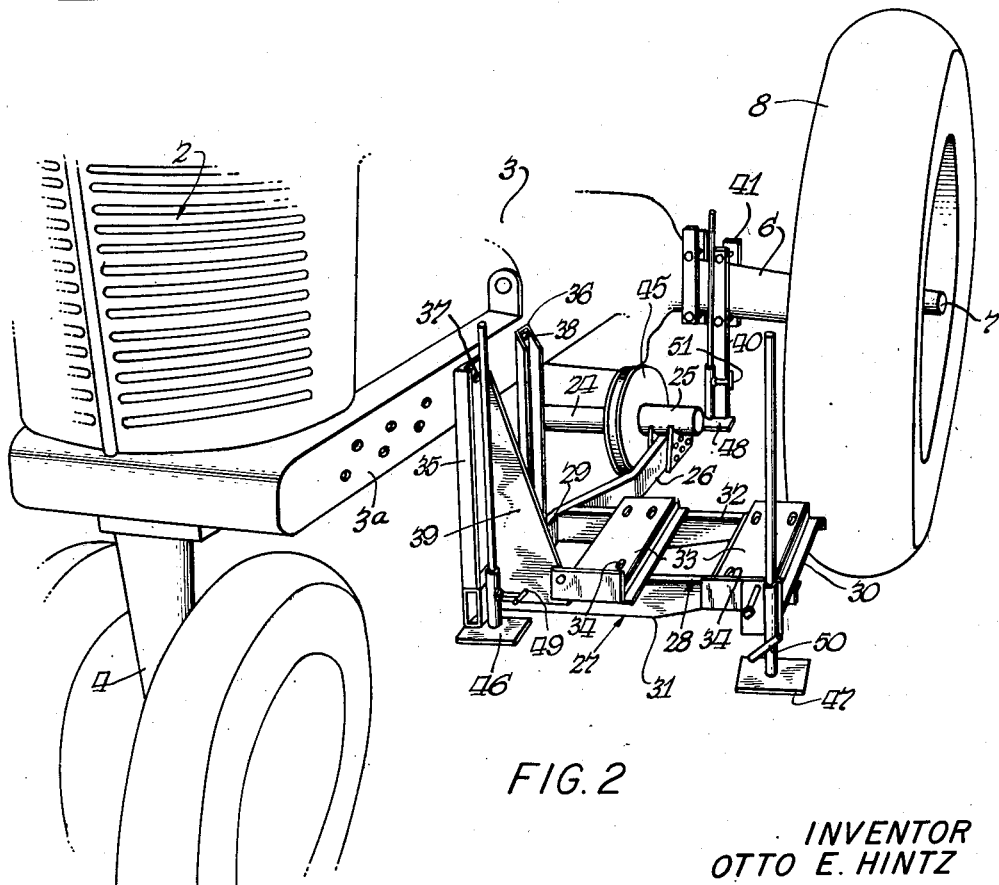
Figure 2 is a perspective view on an enlarged scale illustrating the auxiliary engine mounting framework in association with the tractor.

It will be further observed from a consideration of Figures 1 and 2 that the auxiliary engine is positioned in a convenient out-of-the-way location and at an elevation obtaining in a low center of gravity below the waist of the tractor at the stubbleward side thereof.

It will also be observed that the arrangement is quickly attachable and detachable with respect to the tractor inasmuch as the only attachment to the tractor is in the form of the bolts 36 and 37 to the side rail and the quick clamp 41 to the rear axle 6 and it will be observed that preparatory to such removal of the engine from the tractor, the three jacks 46, 47, and 48 provided respectively at the two forward corners of the platform and at the rear end of the torque arm 26 are lowered and clamped in place by means of the lock screws or lock means 49, 50, and 51 thereof whereupon the disconnection is made at 36, 37 and the clamp 41 which thereupon merely necessitates backing the tractor away from the engine which is on a self-sustaining stand.

What is claimed is:

1. The combination of a tractor having a body with a side power take-off shaft and front and rear wheel means and said rear wheel means comprising laterally extending axle housings, a mounting frame carried by one side of said body and the related axle housing ahead of the adjacent rear wheel means, an implement structure carried on the opposite side of said body and adjacent axle housing between the wheel and the tractor body and having a harvesting component including an input shaft and a processing component including a cutter head with a shaft journalled on said structure, a supplementary power source carried on said mounting frame, drive transmitting means extending transversely under said body and including a one-way clutch drivingly interconnecting said supplementary power source with said shaft of said cutter head, means including a one-way clutch drivingly connecting said power take-off shaft with said shaft of the cutter head whereby the same is driven simultaneously by said power take-off and said supplementary power source and driven by either upon the discontinuance of drive from the other, and means directly drivingly connecting the shaft of said gathering component and said power take-off shaft for drive thereby.

2. The combination of a tractor having a body with a power take-off shaft and front and rear wheel means and said rear wheel means comprising laterally extending axle housings, a mounting frame carried by one side of said body and the related axle housing ahead of the adjacent rear wheel means, an implement structure carried on the opposite side of said body and adjacent axle housing between the wheel and tractor body and having a harvesting component including an input shaft and a processing component including a cutter head with a shaft journalled on said structure, a supplementary power source carried on said mounting frame, drive transmitting means including a one-way clutch drivingly interconnecting said supplementary power source with said shaft of said cutter head, means including a one-way clutch drivingly connecting said power take-off shaft with said shaft of the cutter head whereby the same is driven simultaneously by said power take-off and said supplementary power source and driven by either upon the discontinuance of drive from the other, and means directly drivingly connecting the shaft of said gathering component and said power take-off shaft for drive thereby.

References Cited in the file of this patent

UNITED STATES PATENTS

| | | |
|---|---|---|
| 1,410,725 | Schank | Mar. 28, 1922 |
| 1,475,223 | Cushman | Nov. 27, 1923 |
| 2,212,465 | Baldwin | Aug. 20, 1940 |
| 2,595,336 | Corsentino | May 6, 1952 |
| 2,634,569 | Raney et al. | Apr. 14, 1953 |
| 2,656,868 | Hintz et al. | Oct. 27, 1953 |